Patented Nov. 13, 1928.

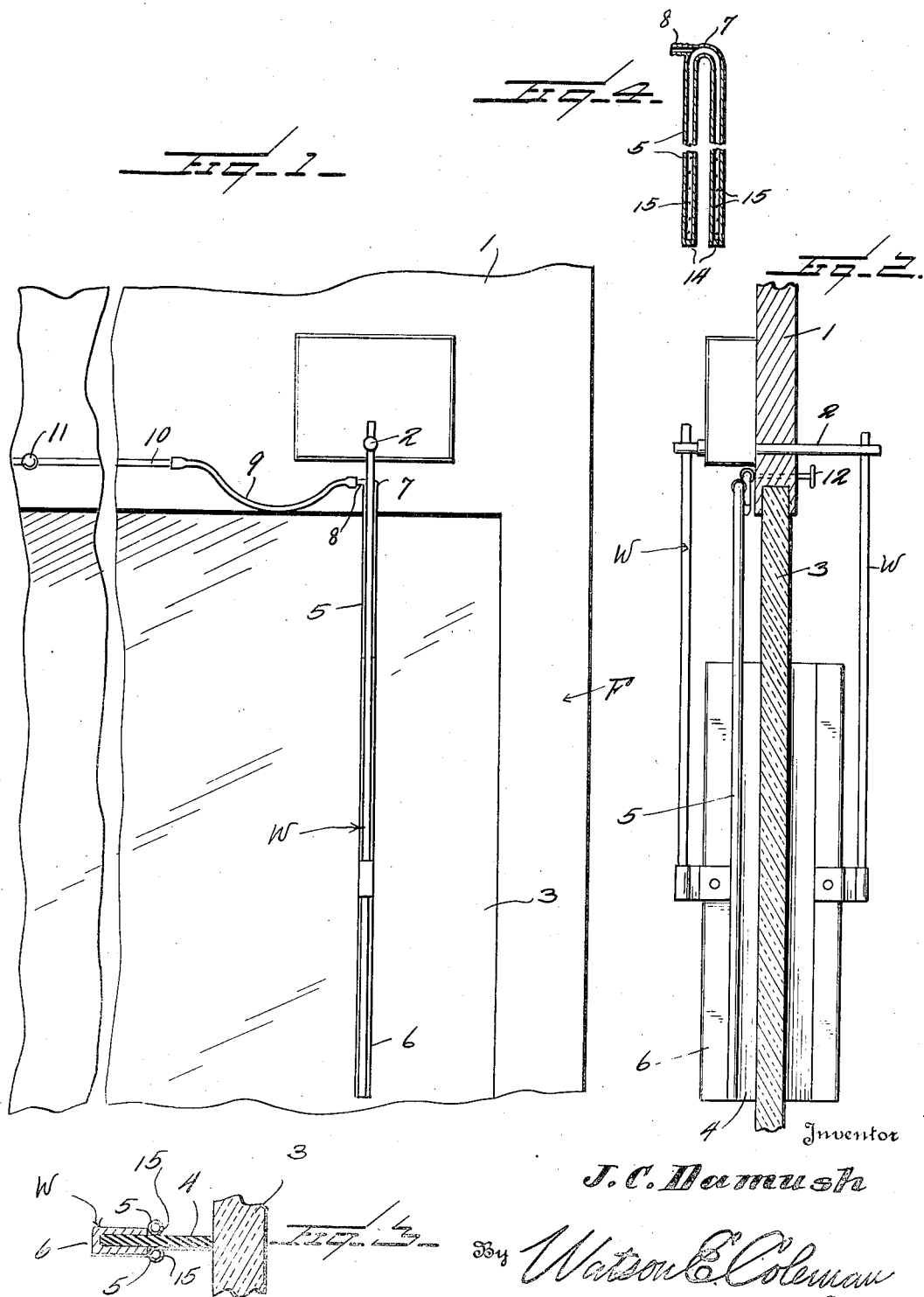

1,691,842

UNITED STATES PATENT OFFICE.

JOSEPH C. DAMUSH, OF SHENANDOAH, PENNSYLVANIA.

WINDSHIELD-WIPER HEATER.

Application filed February 18, 1928. Serial No. 255,457.

This invention relates to a windshield heater and it is an object of the invention to provide a device of this kind wherein a heating medium is carried by and movable with a conventional windshield wiper.

Another object of the invention is to provide a device of this kind which operates to heat from without the portion of the windshield over which a wiper traverses and thereby providing effective means to prevent accumulation of ice or the like upon the windshield which would otherwise hinder or obstruct the desired operation of the wiper.

The invention consists in the details of construction and in the combination and arrangement of the several parts of my improved windshield heater whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in front elevation of a windshield showing a heating device constructed in accordance with an embodiment of my invention applied thereto;

Figure 2 is a view partly in section and partly in side elevation of the structure as illustrated in Figure 1;

Figure 3 is a transverse sectional view taken through one of the wipers as illustrated in Figure 1;

Figure 4 is a fragmentary view in longitudinal section taken through the heating device as herein employed.

As disclosed in the accompanying drawing, F denotes a conventional windshield frame through the upper member 1 of which is directed at a desired point a supporting shaft 2 adapted to be rocked or oscillated in any desired manner. This shaft 2 at both sides of the windshield is provided with the conventional wipers W and W' contacting with the opposite faces of the glass panel 3 of the windshield whereby clear vision for the driver through the panel 3 is assured.

Extending lengthwise along the rear portion of the wiping element 4 of the wiper W are the tubes 5 of requisite dimensions and positioned preferably immediately adjacent to the back 6 of the wiper. These tubes 5 extend from the outer or free end of the wiping element 4 to a point closely adjacent to the shaft 2, the inner end portions of the tubes 5 being connected by a return bend 7 preferably integral therewith and comprising a continuation thereof. The return bend 7 has in communication therewith and extending outwardly and laterally therefrom a nipple 8 with which is suitably coupled a flexible tube 9 which in turn is coupled to a pipe line 10 leading from the exhaust manifold of an engine or from some other desired source of heated vapor, gas or air.

Interposed in the pipe line 10 is a valve 11 whereby the flow through the pipe line 10 to the tubes 5 may be regulated or controlled as desired. As herein disclosed, the operating member 12 for the valve 11 extends inwardly of the frame F so that the valve 11 may be conveniently operated by the driver. The tubes 5 have their outer ends closed, as at 14, and a wall of each of these tubes 5 opposed to the panel 3 is provided with the perforations or jet openings 15 so that the heated fluid entering the tubes 5 will be discharged upon the outer surface of the glass panel 3 to effectively heat the same and thereby preventing the accumulation thereon of ice or the like which would have a tendency to hinder or obstruct the desired travel or operation of the wiper W.

By means of the flexible tube 9 the wiper W is permitted to have requisite working movement and by having the tubes 5 extend closely adjacent to the shaft 2 the flexible tube 9 is not subjected to undue movement when the wiper is in operation.

From the foregoing description it is thought to be obvious that a windshield heater constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a windshield wiper including a wiping element movable across a face of a windshield, tubes extending along opposite sides of the wiping element and having their outer ends closed, the walls of the tubes having jet openings disposed toward the adjacent surface of the windshield, a return bend connecting the inner ends of the tubes and constituting a continuation thereof, a nipple extending outwardly from the bend and in communication therewith, and means for delivering a heated fluid within the tubes through the nipple for discharge through the jet openings upon the adjacent surface of the windshield.

In testimony whereof I hereunto affix my signature.

JOSEPH C. DAMUSH.